Patented Oct. 8, 1929

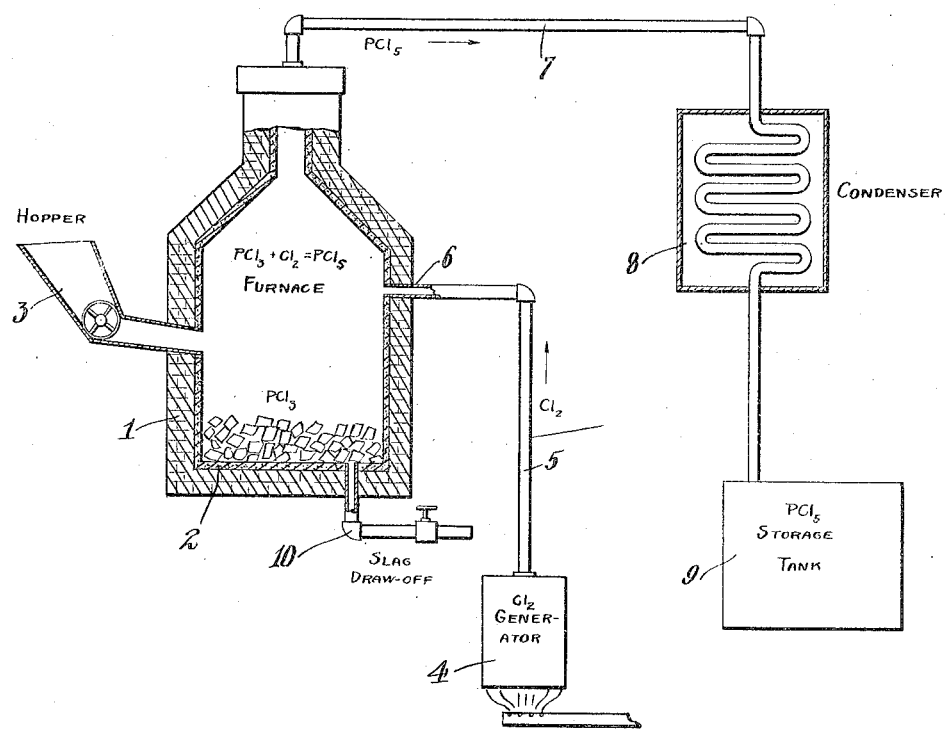

1,730,521

UNITED STATES PATENT OFFICE

CLAUDE G. MINER, OF BERKELEY, CALIFORNIA

PROCESS OF PRODUCING PHOSPHORUS CHLORIDE FROM PHOSPHATE ROCK

Application filed July 6, 1926. Serial No. 120,632.

This invention relates to a process for producing phosphorus chloride from phosphate rock and chlorine.

It is the principal object of this invention to produce phosphorus chloride from phosphate rock in a more economical and more simple manner than has heretofore been employed so as to reduce the cost of production thereof.

It has been found that when a mixture of phosphate rock and silica are heated together at about 1800° C. phosphoric acid is evolved.

It has been discovered, however, that if this reaction is carried out in the presence of a reducing agent, such, for example, as coke, that the reaction is greatly accelerated and takes place with a copious evolution of phosphoric acid (or phosphorus) at about 1300° C.

Various calcium silicates are formed during the smelting of mixtures of phosphate rock, sand and coke, depending on the silica lime (CaO) ratio employed in the charge. The general course of the reaction is usually represented by the following simple equation:

1. $Ca_3(PO_4)_2 + 3SiO_2 + 5C =$

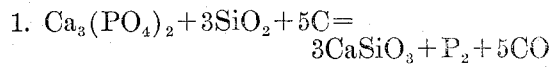
$3CaSiO_3 + P_2 + 5CO$

I have discovered that by adding chlorine during the carrying out of the reaction between the phosphate rock, silica and coke, phosphorus chloride is formed at a red to white heat. As phosphorus pentachloride is decomposed at this temperature, the trichloride is formed. The formation of the trichloride may be represented by the following equation:

2. $Ca_3(PO_4)_2 + 3SiO_2 + 5C + 3Cl_2 =$
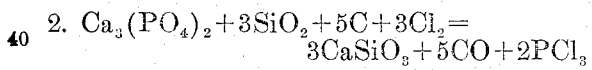
$3CaSiO_3 + 5CO + 2PCl_3$

I have discovered that if, during the carrying out of the reaction represented by Equation 2, there is maintained present an excess of chlorine, phosphorus pentachloride will form on cooling the gases below the decomposition temperature of the said phosphorus pentachloride, which temperature is about 160° C. The formation of the phosphorus pentachloride from the trichloride may be represented by the following equation:

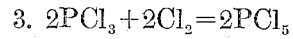
3. $2PCl_3 + 2Cl_2 = 2PCl_5$

In the accompanying drawing, I have illustrated diagrammatically one form of apparatus which may be employed for carrying out the process embodying this invention.

In the drawing, 1 illustrates a furnace which may be of any desired or preferred type. The furnace 1 is preferably provided with a lining 2 of carbon or carbonaceous material with which the furnace is lined in any suitable or desirable method as is well understood in the art.

I have found that the phosphate rock, silica and coke may be more readily handled and intermingled if the same are first ground to about twenty mesh or more and pressed to form briquets, which briquets may be fed into the furnace 1 through a hopper 3, if desired. The furnace 1 is heated in any suitable manner, such as, for example, by introducing fuel into the furnace, as is common practice in blast furnace operations. The furnace 1 may be charged with this fuel through the hopper 3 prior to the introduction of the briquets thereto, and the fuel may be fed, if desired, through the hopper 3 with the briquets.

Chlorine is generated in a chlorine generator by any suitable or desirable method, as is well understood in the art, and the chlorine gas may be conducted through the generator 4 through a conduit 5 and introduced into the furnace 1.

I have found that if the chlorine is introduced into the bottom of the furnace, there will be formed silicon chloride as an impurity. I have also found that if the chlorine is introduced into the furnace at the top or at a cooler part of the furnace such, for example, as illustrated at 6, the chlorine so introduced will not react with the silica present to form silicon chloride but will react with the phosphorus trichloride in accordance with Equation 3 to produce phosphorus pentachloride, which phosphorus pentachloride may be conducted through a conduit 7 to a condenser 8, wherein the phosphorus chloride gas may be condensed and conveyed to a storage container 9, or otherwise disposed of or used as desired.

I have found in the production of phosphorus pentachloride from phosphate rock and silica in the presence of coke, that it is advantageous to employ an excess of about 15% to 20% silica and coke of that required or shown by the Equation 2. The employment of this excess of silica and coke tends to force the reaction toward completion, that is, toward the complete conversion of the phosphorus from the phosphate rock to the phosphorus trichloride.

I have also found that the best results are obtained when employing a silica to lime (CaO) ratio of approximately 61 to 39. This silica to lime ratio is approximately the same proportion as is represented by calcium tri-silicate ($Ca_2Si_3O_8$). The employment of such a silica to lime ratio produces slags more quickly and gives a more complete evolution of phosphorus chloride. The slags formed, employing this silica to lime ratio, are more readily fusible and the slags may be drawn off from the furnace 1 through a slag draw 10.

In carrying out this process, I prefer to first grind phosphate rock, silica and coke to about 20 mesh or more and to press the same into the form of briquets. The briquets are then introduced into the furnace 1 through the hopper 3 through which fuel may also be introduced into the furnace 1. The briquets are then heated in the furnace 1 to a red to white heat in a reducing atmosphere while the chlorine is being introduced into the colder part thereof. The phosphorus pentachloride formed may be conducted through the condenser 8 to the storage tank 9 or may be directly employed in other processes or otherwise disposed of.

Having fully described a preferred embodiment of my invention, it is to be understood that I do not wish to be limited to the exact details herein set forth which may obviously be varied without departing from the spirit of my invention as set forth in the appended claims.

I claim:

1. A process of producing phosphorus chloride from a phosphate and silica, which consists in heating the phosphate and silica to a red to white heat in the presence of carbonaceous matter and chlorine.

2. A process of producing phosphorus pentachloride from a phosphate and silica, which consists in heating the phosphate and silica in the presence of carbonaceous matter to a red to white heat, adding chlorine to the reaction chamber and cooling the products formed in the presence of chlorine to a temperature below the decomposition temperature of phosphorus pentachloride.

3. A process of producing phosphorus pentachloride from a phosphate, silica and carbon in accordance with the following reaction:

$$Ca_3(PO_4)_2 + 3SiO_2 + 5C + 5Cl_2 = 3CaSiO_3 + 2PCl_5 + 5CO$$

4. A process of producing phosphorus pentachloride from phosphate rock, silica and carbon, which consists in grinding the phosphate rock, silica and carbon, forming a briquet of the ground materials, heating the briquets in a reducing atmosphere in the presence of excess chlorine to a red to white heat, drawing off the phosphorus trichloride, excess chlorine and carbon gases formed, and cooling the said products to below the decomposition temperature of phosphorus pentachloride.

5. A process of producing phosphorus chloride from a phosphate, silica and carbon, which comprises heating the phosphate with an excess of silica and carbon to a red to white heat in the presence of chlorine.

6. A process of producing phosphorus chloride from phosphate rock, silica and carbon, which comprises heating a mixture of phosphate rock and silica, which mixture includes silica and calcium oxide of a ratio of approximately 61 to 39, and carbon to a red to white heat in the presence of chlorine.

7. A process of producing phosphorus pentachloride from a phosphate, silica, and carbon, which comprises heating the phosphate and silica and carbon to a white heat in the presence of chlorine, permitting the phosphorus trichloride formed to cool below the decomposition temperature of phosphorus pentachloride, and causing chlorine to react with the phosporus trichloride to form phosphorus pentachloride.

Signed at San Francisco, this 16th day of June, 1926.

CLAUDE G. MINER.